(12) United States Patent
Rider et al.

(10) Patent No.: US 6,346,045 B2
(45) Date of Patent: *Feb. 12, 2002

(54) LARGE SCREEN GAMING SYSTEM AND FACILITY THEREFOR

(75) Inventors: Mark Rider, 27 Strathgowan Crescent, Toronto, Ontario (CA), M4N 2Z6; Tony Lacavera; Gianni Creta, both of Toronto (CA)

(73) Assignee: Mark Rider (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/874,413

(22) Filed: Jun. 6, 2001

Related U.S. Application Data

(63) Continuation of application No. 09/322,914, filed on Jun. 1, 1999, now Pat. No. 6,257,982.

(51) Int. Cl.[7] ............................. A63F 23/02; A63F 9/24
(52) U.S. Cl. ........................................ 463/31; 463/30
(58) Field of Search ............................. 463/30, 31, 34

(56) References Cited

U.S. PATENT DOCUMENTS

| | | |
|---|---|---|
| 4,477,069 A | 10/1984 | Crudgington, Jr. |
| 4,771,344 A | 9/1988 | Fallacaro et al. |
| 4,866,515 A | 9/1989 | Tagawa et al. |
| 4,976,438 A | 12/1990 | Tashiro et al. |
| 5,213,555 A | 5/1993 | Hood et al. |
| 5,215,464 A | 6/1993 | Marshall et al. |
| 5,480,158 A | 1/1996 | Schulze et al. |
| 5,618,045 A | 4/1997 | Kagan et al. |
| 5,674,128 A | 10/1997 | Holch et al. |
| 5,759,101 A | 6/1998 | Von Kohorn |
| 5,835,715 A | 11/1998 | Dahl |
| 5,842,871 A | 12/1998 | Cutler et al. |
| 5,959,717 A | 9/1999 | Chaum |
| 5,973,672 A | 10/1999 | Rice et al. |
| 6,056,640 A | 5/2000 | Schaaij |

FOREIGN PATENT DOCUMENTS

| | | |
|---|---|---|
| DE | 42 21 118 A1 | 1/1994 |
| EP | 0 277 014 | 8/1988 |
| EP | 0 479 422 | 4/1992 |
| EP | 0 631 247 | 12/1994 |
| WO | WO 93/16775 | 9/1993 |
| WO | WO 97 18370 | 5/1997 |
| WO | WO 98/21682 | 5/1998 |

OTHER PUBLICATIONS

"Fun Pad Mixed Entertainment and Advertising"; Heisler, Jill; Advertising Age; May 31, 1999.

*Primary Examiner*—Michael O'Neill
*Assistant Examiner*—Steven L. Ashburn
(74) *Attorney, Agent, or Firm*—Katten Muchin Zavis

(57) ABSTRACT

A system and facility for video games with a large number of user stations and a single screen upon which the video game images are displayed visible from each of the user stations. The system allows for simultaneous use by a large number of users who share the experience of playing the game and their combined reactions together. The system is particularly suited for installation in a motion picture theatre or similar entertainment facility.

9 Claims, 5 Drawing Sheets

LARGE SCREEN GAMING SYSTEM AND FACILITY THEREFOR

This application is a continuation of Ser. No. 09/322,914 filed Jun. 1, 1999 now U.S. Pat. No. 6,257,982.

FIELD OF THE INVENTION

The present invention relates to interactive, computer controlled video games, and to entertainment facilities that accommodate large audiences, such as motion picture theatres.

BACKGROUND OF THE INVENTION

Although modern public entertainment facilities usually represent substantial capital investments, they are often empty much of the time. For example, at motion picture theatres, it is common to have idle periods between the conclusion of one screening and the start of the next screening. In fact, at many theatres, no screenings at all are scheduled during large portions of the day.

While operators of motion picture theatres and theatre complexes have increasingly been providing other diversions for their audiences in a common area separate from the screening rooms, such as on site restaurants, the present inventors have recognized that it would be desirable to utilize the screening rooms themselves and similar entertainment facilities more efficiently, and particularly to use them in a manner that provides an alternate form of entertainment. The present inventors have also recognized moreover that interactive, computer controlled video games represent a form of alternate entertainment that has a significant revenue potential at a motion picture theatre or similar entertainment facility.

The seats of a motion picture theatre or similar entertainment facility could be equipped with individual user stations, each having its own games and its own video screen, such as the arrays of user stations that are found in conventional video game arcades. However, it is an object of the present inventors to provide a unique new scenario for playing video games in such facilities in which the enjoyment of the game is heightened by a large screen, and is enriched by sharing the collective reactions of a large number of other concurrent users, playing a single interactive game.

Existing popular video games include those where only a single user can play at a time, and others that allow two or several assembled users to play simultaneously. Neither of these types of games can be played concurrently by a large number of multiple users.

Recently, a third variety of video game has appeared which allows a large number of multiple users to play concurrently, but from remote user stations that are linked by means of a local area network or the Internet. The users are not all assembled together so there is no opportunity to share the experience of each other's reactions.

Other video game systems and facilities have also been proposed that permit play by multiple users.

Crudgington, Jr. (U.S. Pat. No. 4,477,069), for example, discloses a futuristic styled theatre which contains a plurality of game consoles, one for each player. All players participate in the same performance which is controlled by a master computer but each player has his own monitor to view the game.

Tashiro et al. (U.S. Pat. No. 4,976,438) discloses a system where a number of players are arranged in a circle at individual consoles. The players can simultaneously play a game using a common screen (110) which surrounds the players. The apparatus contains a wide variety of mechanical systems to move the seats used by the players. As best shown in FIG. 4, and described at column 4, line 8, each player has a limited range of the screen over which he may play.

Marshall et al. (U.S. Pat. No. 5,215,464) discloses a system for law enforcement or military weapons training. Multiple trainees (who are on foot and mobile) interact with a simulated training exercise displayed on a single large video screen. The trainees utilize firearms to shoot an infrared beam at opponents on the screen. The infrared beams are detected by the computer system running the simulation and the system will fire back an infrared beam in the direction of the originating shot.

Trainees wear detectors that indicate if they have been hit.

Kagan et al. (U.S. Pat. No. 5,618,045) discloses a system of multiple hand held playing devices that communicate over a wireless LAN to allow multiple players to play the same game. The individual playing devices may also communicate to a large display to show the game scenario.

Dahl (U.S. Pat. No. 5,835,715) discloses a theatre based system for allowing users to make choices as to what content they wish to see on the main screen, sub-screens of the main theatre screen, or a screen in their individual seat computer. The theatre also incorporates a series of robots in front of the screen to simulate an imaginary creature to add to the video presentation.

None of the proposals known to the inventors discloses or suggests a gaming system for use in a motion picture theatre or similar entertainment facility in which a large number of simultaneous multiple users can share the same game experience together, heightened and enriched by also sharing in the reactions of the total group.

SUMMARY OF THE INVENTION

According to a first aspect of the present invention, there is provided a gaming system which includes a computer, game software, a plurality of user stations, a projector, and a projection screen. The game software is executed by the computer and can permit numerous multiple users to participate in a single game, up to substantially an entire audience of a motion picture theatre or other entertainment facility. The game software for a large facility can permit up to hundreds of multiple users to participate in the game. For a small facility the game software need only be able to permit up to a few dozen users to participate. The user stations each has communication means, and also has interface means for receiving user input transmitted from the user stations to the computer via the communication means. The projector is connected to the computer, and the computer aggregates the user input to create video images for display by the projector. These video images are displayed by the projector on the projection screen such that they are fully visible from each of the user stations.

The present invention can thus provide for video game control stations at the seats of a motion picture theatre or similar entertainment facility such that the members of a large or very large audience may from their seats participate in a multiple user video game which is displayed on a large screen visible to all. This game playing scenario is unique in that it allows for a large number of simultaneous multiple users to share the same game experience together, and it allows them to share the reactions of each other as the game is played.

According to another aspect of the present invention, there is provided an entertainment facility, including an enclosure having a plurality of seats to accommodate an audience of a plurality of user stations a screen, the total area of the screen visible from each of the user stations; a projection system for projecting images on the screen; and a computer connected to each of the user stations and the projection system, the computer controlling the images projected on the screen, the computer receiving user input for display on the screen from the user stations.

According to another aspect of the present invention, there is provided a method for playing a game in an entertainment facility, the method having the steps of: providing a user station at each seat in the theatre; providing a user interface to receive user input from each of the user stations; integrating the images from the game with the user input; and projecting the results of the integrating on a single screen, the results being visible from each of the user stations.

According to another aspect of the present invention, there is provided a method for operating a commercial motion picture theater comprising the steps of alternately: displaying a motion picture after admitting members of the public to view it upon payment of an admission fee; and operating computer game software that displays images on a screen in the theater, created by a computer that responds to player input from a plurality of user stations located at the seats of the theater. Preferably, the method includes providing public access to user stations at a plurality of seats in the theater, accepting and validating identification from users at the user stations to allow them to engage as players in computer game play, initiating the game play when motion pictures are not being displayed, accepting input provided by the players via the user stations aggregating the input to create game images, displaying the game images, and terminating the game and subsequently displaying a motion picture. Most preferably, the method also includes the step of debiting the user identification in an amount charged as payment to engage in the computer game, for example by means of a smart card, credit card or debit card.

According to yet another aspect of the present invention, there is provided an entertainment facility, comprising a theater having a projection screen and a plurality of seats arranged in rows facing the screen, a projector for showing motion pictures on the screen, a computer, game software executed by the computer, a plurality of user stations, each having communication means and also interface means for receiving user input, and means connected to a computer for displaying video images created by the computer in response to the user input.

DETAILED DESCRIPTION OF THE PREFERRED EMBODIMENT

Figure 1:
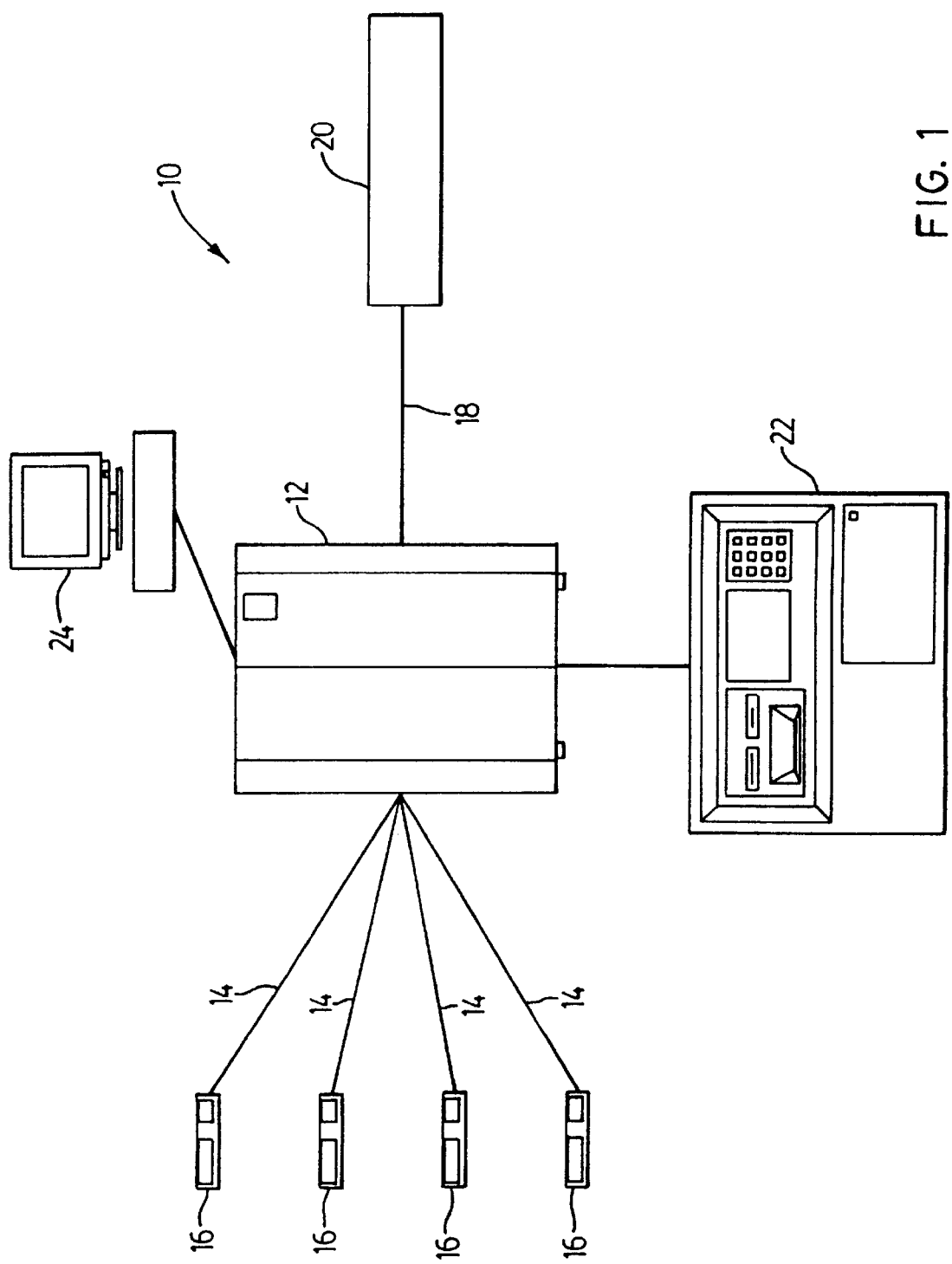
FIG. 1 is a schematic diagram illustrating the components of the multiple user gaming system of the present invention.

Referring first to FIG. 1, a schematic diagram illustrating a gaming system according to the present invention as applied to a theatre environment, the system is shown generally as 10.

In the preferred embodiment the gaming system is installed in a movie theatre having a projector for screening motion pictures. The system 10 comprises a game server 12, a plurality of game controllers 16, a theatre projection system 20, a purchasing/credit system 22, and a control console 24. Game server 12 is a computer system capable of allowing a plurality of users to play a video game. A plurality of game controllers 16 are connected to game server 12 by game controller communication links 14. The input from the game controllers 16, provided by links 14 is processed by game server 12. Game server 12 renders the input from each game controller 14 and creates updated game images which are then passed to theatre projection system 20 via theatre projector communication link 18. Theatre projection system 20 displays the input from game server 12 on a theatre screen (not shown). Images passed via link 18 are of SVGA quality or better thus allowing theatre projection system 20 to project true colour graphics onto the entire theatre screen. Theatre projection system 20 may be mounted on the ceiling of the theatre, or contained within the projection booth. Theatre projection system 20 works in conjunction with a conventional movie projector (not shown) so that images may be displayed on the theatre screen by the conventional movie projector, the projection system 20 or both projectors simultaneously.

Purchasing/credit system shown generally as 22 is a control system for recording and monitoring the account status of individuals that play a game. More specifically, it tracks which users have paid to play a game and further allows for credits to be awarded to the accounts of game winners.

Control console 24 provides an interface to the game server 12 through which a system administrator may control game flow including starting and re-starting games. Control console 24 also allows the system administrator to perform administrative tasks such as maintenance, backup, game installation and game removal.

Figure 2:
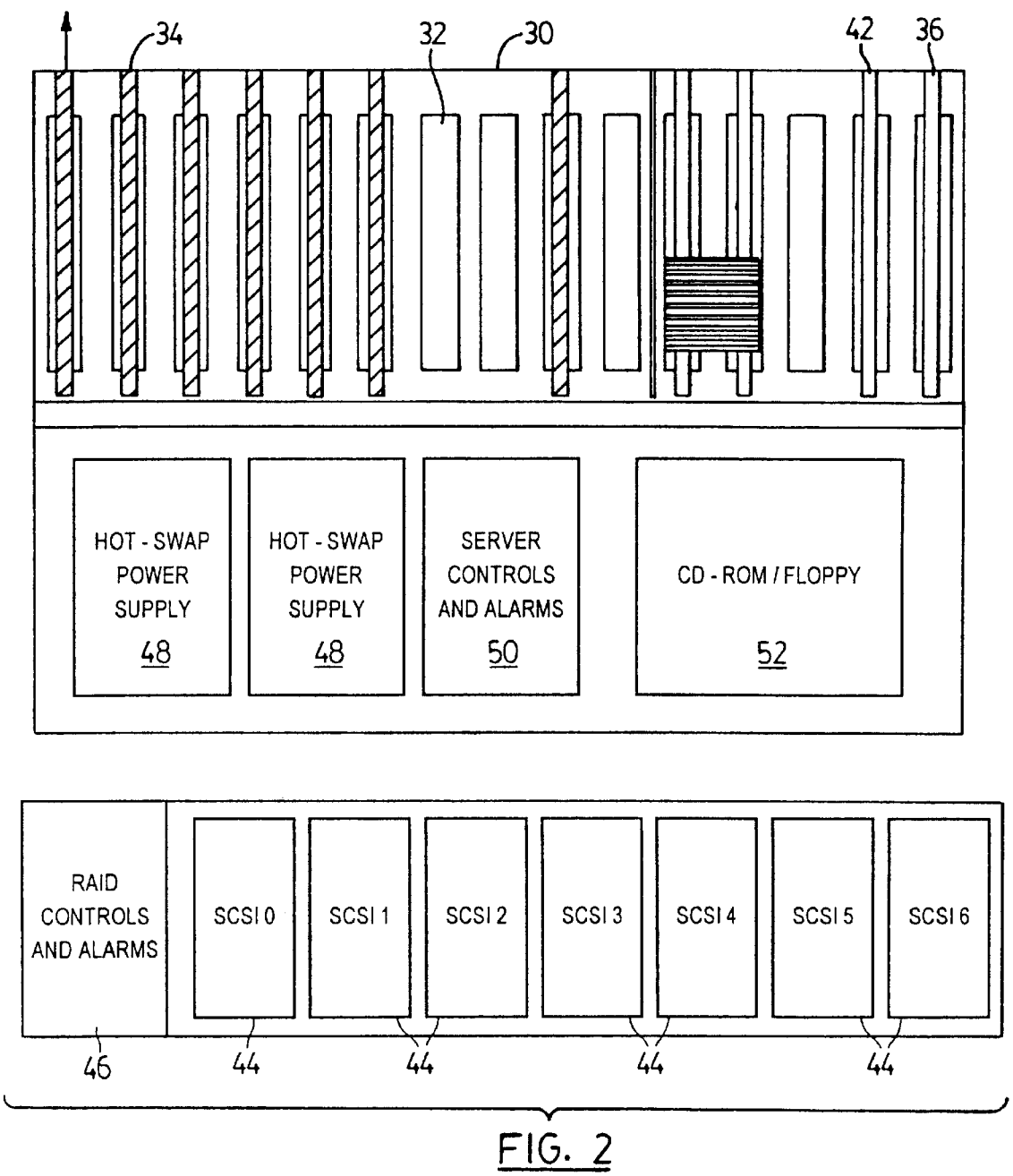
FIG. 2 is a schematic diagram illustrating the components of the game server.

Referring now to FIG. 2, the components of the game server 12 are illustrated in a schematic diagram. Game server 12 is a computer having an ISA backplane bus 30, with a plurality of bus slots 32. The slots 32 of the bus 30 are populated with high density serial cards 34, single board CPUs 36, video controller 38, and RAID Controllers 42. Serial cards 34 support the game controller communications links 14 connecting game server 12 to game controllers 16. Links 14 in the preferred embodiment are serial connections capable of 115,000 BAUD communication but may be any other form of communication such as infrared or ethernet that provide the necessary bandwidth required by game server 12. Single board CPUs 36 may be of any suitable configuration including multiple processors with shared cache, and a large amount of RAM, on the order of one gigabyte or greater. Video controller 38 uses system RAM and has a 3D daughterboard for image rendering. Video controller 38 is connected to theatre projection system 20 by theatre projection control link 10. Video controllers 38 controls the images displayed on the theatre screen by theatre projection system 20. RAID controllers 42 are of the Adaptec 1000 Series.

RAID controller 42 controls a plurality of SCSI drives 44 which store information on the current status of the game being played as well as user account information. RAID controls and alarms 46 monitors each of the SCSI drives 44 and alerts the RAID controller 42 of any abnormalities in operation.

Game server 12 further comprises a plurality of hot-swap power supplies 48 each of which may be replaced while game server 12 is running, without interrupting the function of game server 12. Server controls and alarms 50 serves to monitor and coordinate any abnormal behaviour occurring on game server 12. CD-Rom/Floppy 52 provide a means by which programs or data may be copied from a CD-ROM or floppy disc to be stored on game server 12. CD-ROM/Floppy 52 may also be used to store information from the game server 12. A streaming tape drive may also be used to provide alternative or additional data storage and recovery capability.

The configuration of game server 12 allows for system scalability in that multiple high density serial cards 34 may be added to support large numbers of game controllers 16.

Figure 3:
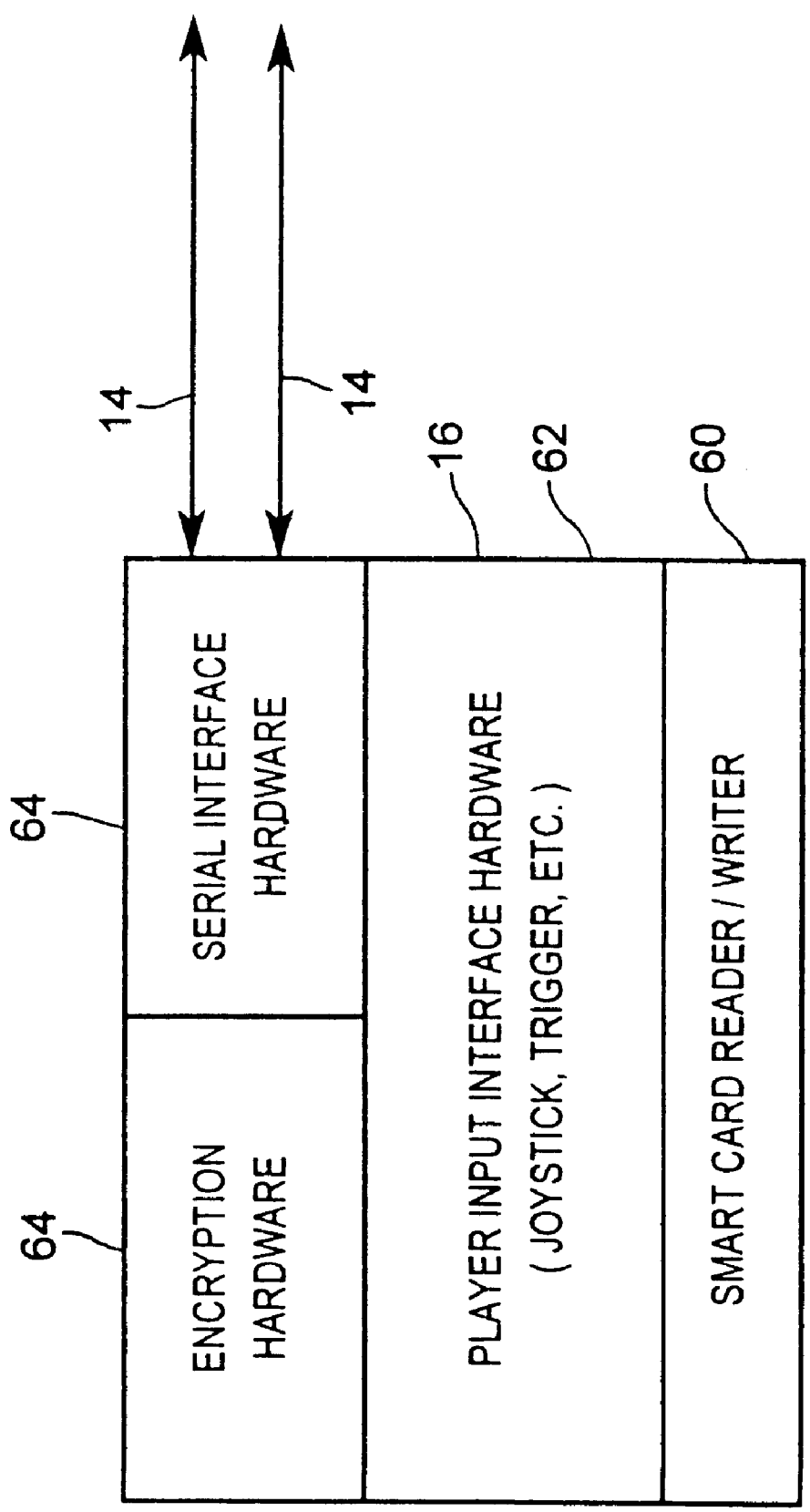
FIG. 3 is a schematic diagram illustrating the components of a game controller.

Referring now to FIG. 3, the components of game controller 16 are shown in a schematic diagram. Game controller 16 comprises: game card reader/writer 60, user input interface 62, encryption component 64, and serial interface 66. Game controller 16 comprises the hardware and software which allow the user to register for and play a game. By inserting a game card 68 (not shown) containing sufficient credit into game card reader/writer 60, the user may play a game. Game card 68 in the preferred embodiment is a smart card.

Game card 68 will contain user profiling information such as a user name, a specific theatre or range of theatres for which the card is valid, and the "nickname" chosen by the user when playing the game. If the game card 68 provided by the user does not have sufficient credit, the user may optionally insert money into the game controller 16 via a cash box (not shown). Other means of obtaining credit may include a card swipe device for credit cards, debit cards or the like, the verification of which would occur over game controller communication link 14. Game card reader/writer 60 is not required to practice the present invention. For example, an implementation of the present invention may choose to provide free access to the game controller 16.

The user plays the game through user input interface 62. User input interface 62 is a set of controls that allow the user to play a variety of games. A joystick, trackball, and control buttons would be typical features. A headset (not shown) may also be provided to supply the user with gaming sound effects. Additional components such as infrared pointing devices or a virtual reality interface may further enhance the gaming experience. As can be appreciated by one skilled in the art of user input interfaces, the user input interface 62 of the present invention may be enhanced to include tactile response. Such tactile response could extend to the theatre seats which could impart horizontal, vertical and vibrational motions. The actions input by the user to user input interface 62, are sent to serial interface 66, which in turn communicates with game server 12 by way of game controller communication link 14.

Encryption component 64 provides encryption hardware and software to allow a user to securely transmit and receive information between game card reader/writer 60 by way of game controller communication link 14.

Figure 4:
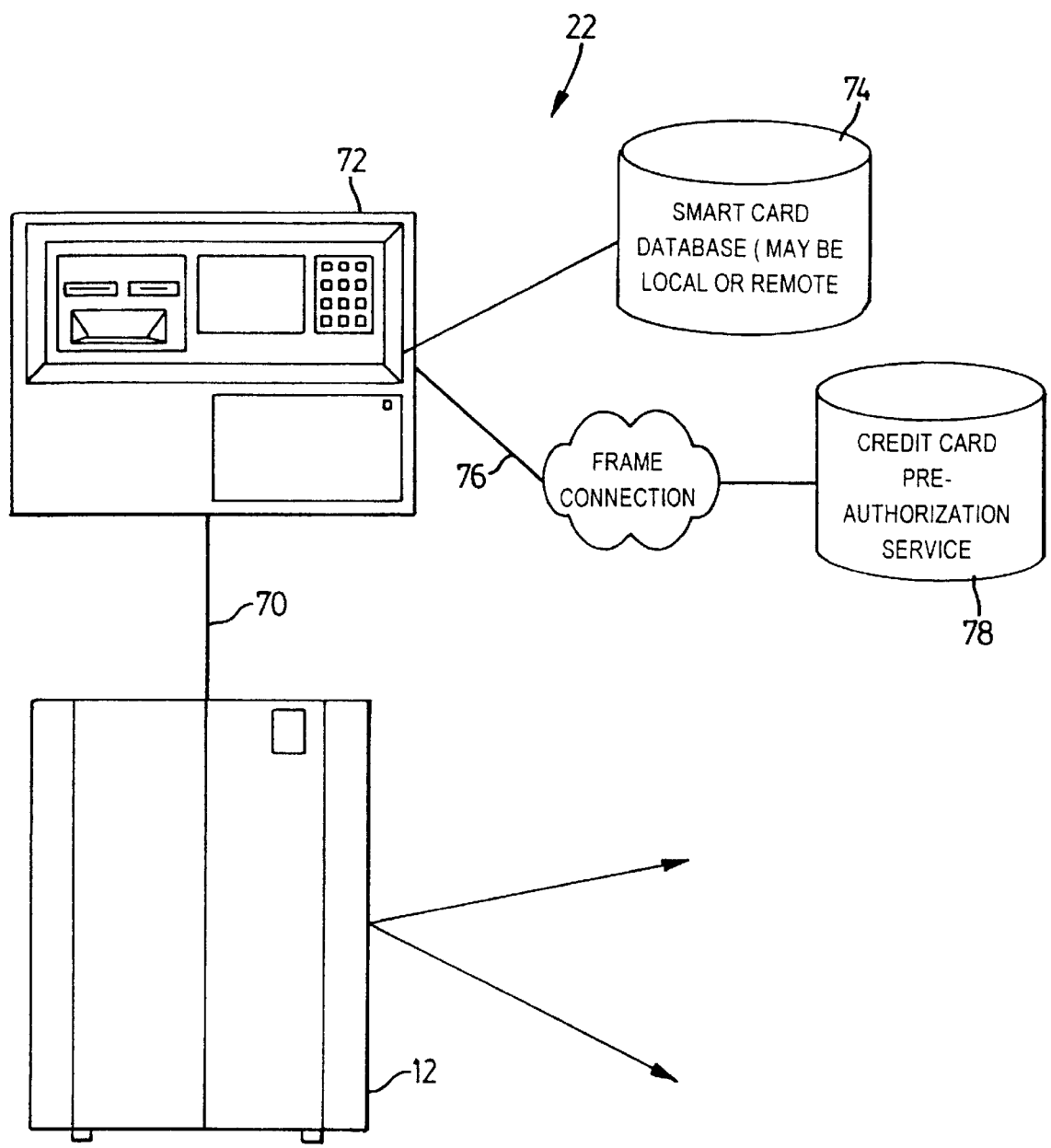
FIG. 4 is a schematic diagram illustrating the components of the purchasing/credit system.

Referring now to FIG. 4, the components of the purchasing/credit system shown generally as 22 are shown in a schematic diagram. Purchasing/credit system 22 comprises a credit link 70, a plurality of purchase/credit stations 72, a game card database 74, and a main frame connection 76.

Purchasing/credit system 22 allows an individual to purchase credits for the playing of games. Credits are purchased at one of a plurality of stations 72 by introducing a game card 68 (not shown) to station 72. Credit may be added to a game card 68 by such means as cash payment, direct bank withdrawal or credit card transfer. Additional means for obtaining credit or points are described below. When credit is required from a credit card or direct bank payment, station 72 will connect to a bank clearing house 78 by way of mainframe connection 76 to transfer credit to the game card 68. Alternatively, should direct user access to a station 72 not be available, theatre staff would handle the applying of credit to game card 68.

All data regarding the current status of a game card 68 as well as demographic information on the user is stored in game card database 74. Demographic information includes the given name of the user as well as a "nickname", previous scores, handicap data, location specific data, purchase data history, winning credit amounts, and other details specific to the user. During play, a winning user may obtain additional credits which are conveyed to station 72 by game server 12 over credit link 70. The credits then being applied to the game card 68 of the winning user. The number of points or credits acquired for a win will vary depending upon the game and also depending upon the skill level of the winner. A less skilled user will receive bonus points for defeating a more highly skilled user. A user's game playing record may be stored on the game card 68 or potentially on the database 74, so that if a less skilled user defeats a more skilled user, the less skilled user obtains extra bonus points on the card.

In use, the user would enter the theatre complex and locate a purchasing/credit station 72. If the user did not have a game card 68 he or she may obtain one from the theatre staff or from the station 72, by payment of cash, or through the use of a debit card, credit card or any other electronically negotiable instrument. If the user has an existing game card 68 he or she may inquire as to their balance and add credit. In the preferred embodiment game card 68 will be valid for an unlimited period of time, but may alternatively be programmed to expire after a fixed date. In addition, a limited amount of credit may be added to a game card 68 so that if game card 68 is lost by the user the user does not lose a significant amount of money.

Once seated the user would then validate his or her game card 68 at the game controller 16 associated with his or her seat to authorize the user to play a game. Forms of validation may comprise: swiping, insertion or proximity recognition. Game controller 16 may also contain a numeric keypad which the user would utilize to enter a personal identification number (PIN) in order to validate his or her game card 68 and to help confirm the identity of the user of game card 68.

Some games may allow the user to join immediately, others may require that the user wait until the next game begins. Users are placed in a first come first out (FIFO) queue for games yet to be played.

Once the user has paid to play a game he or she may participate in the next available game. Each game will be sufficiently short in duration to allow users to enter a new game without waiting too long. Multiple games may be played before and after the screening of a motion picture.

In an alternative embodiment, the theatre may simply be used as a game emporium, where games may be played that extend for hours. Multiple screen cinemas may provide a plurality of games of different interests, much as they now provide for diverse motion pictures.

The present invention makes use of the existing power facilities of a theatre. The game server 12 requires a standard 110/120 or the like power outlet and no power is required to the game controller, as power for data transmission is provided by the game server 12.

With regard to the types of games to be played, some of the considerations that must be weighed in creating a new game or in the migration of an existing game to the present invention are:

a) substantially every seat in the theatre may be equipped to play although there may be a maximum number of users per game that is less than the total number of seats in the theatre;

b) games prior and subsequent to motion picture screenings will primarily be action/adventure games as first-person perspective or role-playing games are too long to play out;

c) first-person perspective or role-playing games may utilize the theatre when movies are not being shown;

d) everyone in the theatre may potentially join in a game, while the game is being played, depending on the game, it may not be a disadvantage to join a game that has already started;

e) the game can be joined at any time, or all users must be registered before the game begins;

f) in games to be played before the screening of a motion picture starts, game duration will be short enough to permit several games to be played;

g) games can be common goal games where all participants are pursuing the same objective, or they can be competitive;

h) there could potentially be two or more games ongoing by splitting the screen to display multiple games concurrently, so that a new game starts every minute as opposed to a longer period;

i) user handicaps may be introduced to make it more difficult for expert users to win consistently; and j) games may be played between multiple users from multiple venues.

Game Programming Interface (GPI)

In order to program game server 12, a Gaming Programming Interface (GPI) 80 (not shown) is provided. Gaming Programming Interface 80 is a library of computer software functions to access and communicate with the underlying software and hardware provided by the gaming system 10. The GPI 80 is structured in such a way as to take advantage of the underlying hardware, yet remain generic so that platform upgradability will be facilitated.

The GPI 80 serves as a middleware layer between the game software and the gaming system 10. This architecture of gaming system 10 allows for upgrades and expansion without affecting game developers.

Game developers that are familiar with common Operating System Application Programming Interfaces (OS API's) will find the GPI 80 libraries familiar. The complexities of the multi-user environment will be hidden from the developer.

The GPI 80 provides functions that can be used by game developers to access the game controller 16 and game card reader/writer 60 located at each seat in the theatre. This functionality includes retrieving data from the game controllers 16, sending data to the game controllers 16, and polling the game controllers 16 to determine when a new user has entered the game. In addition, since the game card reader/writer 60 are located with the game controller 16, the GPI 80 also provides functions to retrieve user data from the game card 68, remove credit/money from the game card 68, and add credit/money to the game card 68.

In order to allow the game developer the ability to display the video game on the theatre projection system 20, GPI 80 functions are available for the play area of the projected display, as well as a commercial area of the display. In this manner, a game is given access to a certain area of the screen, and surrounding areas are made available for advertising. The GPI 80 will provide for a generic interface to various projection systems.

In the preferred embodiment game development will be based on the Windows operating system, and thus will utilize the pre-existing Windows API set. A description of the functionality provided by the GPI 80 follows.

Game Controllers

There will be multiple game controllers 16 connected to the gaming system 10, and as such, a game developer will require access each controller. The following functions for game controllers 16 will be provided as part of the GPI function set:

Function: $GPI_{13}$ ActivateController

Description: The function will be used to activate the controller as specified in the parameters. Once the controller is activated, the gaming system will poll that controller for events. If the controller is inactive, then any movements at the controller will not be recorded.

Function: GPI_ActivateController

Description: The function will be used to deactivate a controller once an individual has finished playing. This removes the controller from the pool of controllers that the gaming system polls for events.

Function: GPI_RegisterControllerEvent

Description: The function will be used to register an event per available controller or one event for all controllers. This event will be signalled when a controller movement is recognized.

Function: GPI_RegisterControllerCallBackFunction

Description: This function will register a call back function supplied by the developer that will be called when a controller event is detected. A call back function can be supplied for each controller or for all the controllers.

Function: GPI_GetControllerEvent

Description: This function will be used to read the next event in queue from the controller specified in the parameters. Each event generated by the controller will be placed in a queue and will remain there until the application reads it.

Function: GPI_ControllerDisplay

Description: This function will control any lights or displays made available on the individual controllers. This will be used primarily to indicate when it is time for an individual to play (a light will be activated on the controller).

Function: GPI_GetNumOfControllers

Description: This function will return the number of available controllers attached to the Gaming system.

Figure 5:
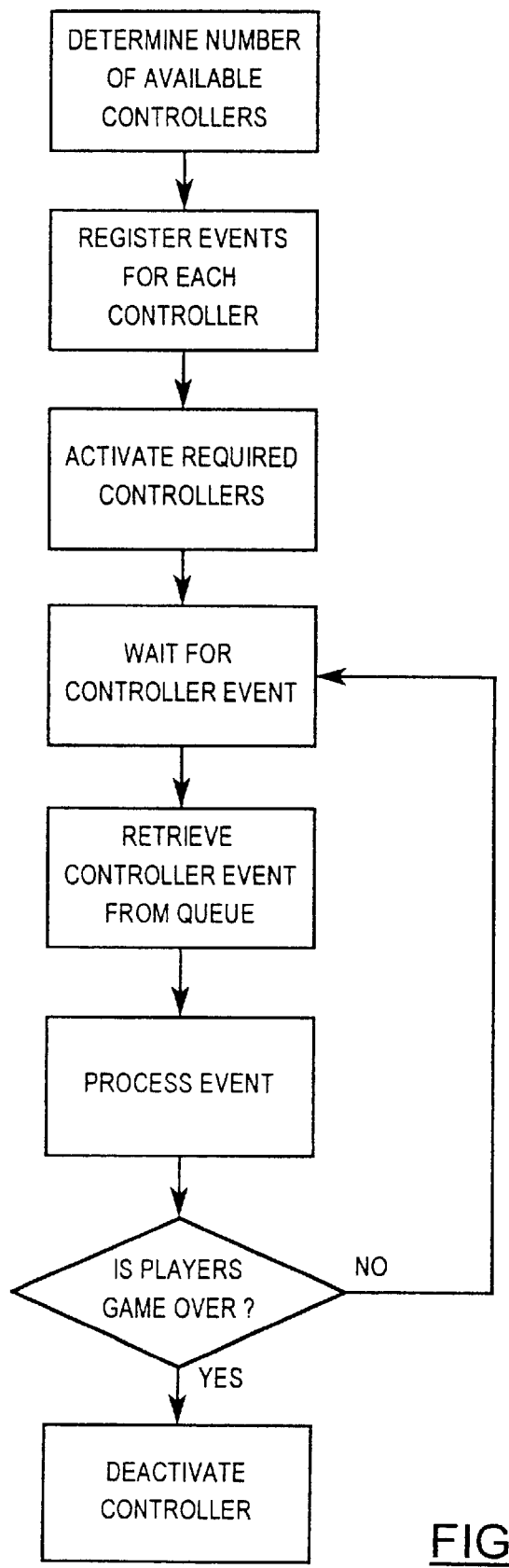
FIG. 5 is a flow chart illustrating the control logic for game controllers.

Utilizing the above functions, a game developer may develop a gaming application that interfaces with the game controllers 16 of the gaming system 10 in a manner as illustrated by the flowchart of FIG. 5.

Card Readers

The card reader 60 permits a user to pay to play and to receive credits upon winning. The reader 60 must be controllable so that the appropriate credits may be added and removed. The following functions are provided by the GPI 80 to access the card reader 60.

Function: GPI_RegisterCardReaderEvent

Description: This function will be used to register an event per card reader or one event to represent all card readers. This event will be signalled when an event is detected at a card reader (i.e. card inserted or card removed).

Function: GPI_RegisterCardReaderCallbackFunction
Description: Similar to the above function, but this function will be used to register a call back function rather than an event. This call back function will be called whenever a card reader event is detected.
Function: GPI_ReadCardInfo
Description: This function will be used to retrieve user specific information from the game card. This information may include the users "nickname", the game card ID, the users handicap or skill level, etc.
Function: GPI_WriteCardInfo
Description: This function will be used to populate the user information stored on the card. This will be used frequently to upgrade or downgrade a users difficulty level as time goes on.
Function: GPI_GetCurrentPlayers
Description: This function does not directly access the card reader but is related because it will retrieve a list of all the users currently playing or waiting to play. The list will include and identifier of the users seat, the game card ID, and the users "nickname".
Function: GPI_GetCreditInfo
Description: This function will retrieve the amount of credit currently available on a users game card.
Function: GPI_AddCredit
Description: This function will be used to add credit to a users game card.
Function: GPI_RemoveCredit
Description: Used to remove credit from a users game card.
Function: GPI_EjectCard
Description: Used to eject a game card from a card reader once the users game is over.
Database Functions The GPI provides functions to access and create records and tables in the game card database 74. This may be useful for game developers who wish to store various game parameters or scores in a secure area. The database 74 contains game scores, and as such has GPI 80 functions to add a new score to the database 74, remove a score, and retrieve a list of scores. The database 74 will be accessible using standard ODBC SQL commands.

Video Controller Functions

As mentioned previously, the gaming system 10 will permit developers to access the video controller via existing Windows functions. As development progresses, the GPI will be extended to encompass the video controller in its API set.

Sound Controller Functions

The initial stage of the gaming system 10 will permit developers to use standard Windows APIs to access the sound card.

The theatre sound system (not shown) is driven by a single board CPU 36 of the gaming system 10, and as such, has a generic interface. The GPI will primarily provide functionality to access the single board CPU 36 for sound generation rather than recording. Functionality for recording, may also be provided.

With regard to attracting and retaining game users, the inventors consider the following to be potential marketing initiatives:

a) advertising in conjunction with the currently playing movies, the advertising to indicate game titles that are playing in each theatre along with the actual movie showing;

b) tournaments, the winner from one theatre will play a synchronized game against winners from other theatres while everyone in the respective local theatre may watch;

c) expert users may become know on a national level and be rewarded for making theatre appearances;

d) a new game may be linked to new movie or theatre opening, or the release of a game a month or so in advance of the release of the movie, may serve as a more substantial "teaser" or introduction to the movie as opposed to the traditional form of movie trailers;

e) game cards may be used to acquire credit at venues outside the theatre, for example, they may be recognized by retailers who would add credits for retail purchases; and f) in addition to projecting the game, the projection system 20 can simultaneously project advertising, advertising space on the screen may be sold by the theatre or by a local or national agency.

Although the inventors have chosen the software implementing the preferred embodiment of the GPI 80 of the gaming system 10 to execute on the MicroSoft Windows Operating System, one skilled in the art will recognize that many operating systems provide similar functionality, the decision of the inventor to in selecting Windows was based upon their market share. The invention may be implemented on any other operating system.

The gaming system 10 is not intended by the inventors to be restricted to movie theatres. Gaming system 10 may reside in any multiple use facility such as a stadium, amphitheatre, concert hall or the like. Any facility, regardless of the size, that is capable of housing the equipment required for the present invention and allowing for the use of multiple users is intended by the inventors to be within the scope of the present invention. The scalability or expandability of the disclosed architecture, provides for such a capability.

It is to be understood that the invention is not limited in its application to the details of and arrangement of components illustrated in the accompanying drawings, since the invention is capable of other embodiments, and of being practiced or carried out in various ways within the scope of the claims. Also it is to be understood that the phraseology and terminology employed herein is for the purpose of description and not limitation. For example, the term "video game" is intended to encompass any interactive gaming system with a visual display.

We claim:

1. A method of providing large screen, interactive computer gaming in a screening room of a motion picture theater having a projection screen on which game images can be displayed, said method comprising the steps of:

providing public access to user stations at a plurality of seats in said motion picture theater screening room;

allowing said users to engage as players in computer game play displayed on said screen;

initiating said game play when said screen is not being used to display a motion picture;

accepting manual inputs provided by said players via said user stations;

in response to said manual inputs, aggregating the user inputs to create game images;

projecting the created game images on said screen; and terminating said game play before said screening room is used to display a motion picture.

2. The method of claim 1, wherein said game images comprise video game images.

3. The method of claim 2, further comprising the step of accepting and validating identification from said users at said user stations, before allowing said users to engage as players in said computer game play.

4. The method of claim 3, further comprising the step of debiting said user identification in an amount required as payment to engage in said game play.

5. A method of providing large screen, interactive computer gaming in a screening room of a motion picture theater, said method comprising the steps of:

after projecting motion pictures in said screening room, allowing users to engage as players in computer game play displayed on the screen of said screening room;

initiating said game play when said screening room is not being used to display a motion picture;

accepting manual inputs provided by said players via user stations at a plurality of seats in said motion picture theater screening room;

in response to said manual inputs, aggregating the user inputs to create game images; and displaying the created game images on said screen at a time when no motion pictures are being projected thereon.

6. The method of claim 5, wherein said game images comprise video game images.

7. The method of claim 6, further comprising the step of accepting and validating identification from said users at said user stations, before allowing said users to engage as players in said computer game play.

8. The method of claim 7, further comprising the step of debiting said user identification in an amount required as payment to engage in said game play.

9. A method of providing interactive entertainment in a motion picture theater screening room having a plurality of seats, comprising the steps of:

at some times displaying a motion picture in said motion picture theater screening room after admitting members of the public to view said motion picture; and at other times, when not displaying a motion picture, operating computer game software that displays computer game images in said motion picture screening room in response to user manual inputs received from user stations disposed adjacent at least some of said seats, the images being created by a computer that responds to player input from the user stations.

* * * * *

EX PARTE REEXAMINATION CERTIFICATE (6119th)

United States Patent
Rider et al.

(10) Number: US 6,346,045 C1
(45) Certificate Issued: *Feb. 12, 2008

(54) LARGE SCREEN GAMING SYSTEM AND FACILITY THEREFOR

(75) Inventors: Mark Rider, 27 Strathgowan Crescent, Toronto, Ontario (CA), M4N 2Z6; Tony Lacavera, Toronto (CA); Gianni Creta, Toronto (CA)

(73) Assignee: Mark Rider, Toronto, Ontario (CA)

Reexamination Request:
No. 90/008,140, Aug. 24, 2006

Reexamination Certificate for:
Patent No.: 6,346,045
Issued: Feb. 12, 2002
Appl. No.: 09/874,413
Filed: Jun. 6, 2001

(*) Notice: This patent is subject to a terminal disclaimer.

Related U.S. Application Data

(63) Continuation of application No. 09/322,914, filed on Jun. 1, 1999, now Pat. No. 6,257,982.

(51) Int. Cl.
*A63J 23/02* (2006.01)
*A63F 9/24* (2006.01)

(52) U.S. Cl. .......................................... 463/31; 463/30

(58) Field of Classification Search ............. 463/30–34; 455/2.01; 725/24
See application file for complete search history.

(56) References Cited

U.S. PATENT DOCUMENTS

| | | |
|---|---|---|
| 4,974,252 A | 11/1990 | Osborne |
| 5,465,384 A | 11/1995 | Bejan et al. |
| 5,737,527 A | 4/1998 | Shiels et al. |

OTHER PUBLICATIONS

"Interactive 'Ride' is Here—Run for your Life", San Francisco Chronical, May 6, 1995.
"Ride for Your Life–really", San Francisco Chronical, May 5, 1995.
"Ride for Your Life", Box Office Magazine.
"New Technology exploits kids in Ride For Your Life" The Tech, May 5, 1995.

*Primary Examiner*—Matthew C. Graham

(57) ABSTRACT

A system and facility for video games with a large number of user stations and a single screen upon which the video game images are displayed visible from each of the user stations. The system allows for simultaneous use by a large number of users who share the experience of playing the game and their combined reactions together. The system is particularly suited for installation in a motion picture theatre or similar entertainment facility.

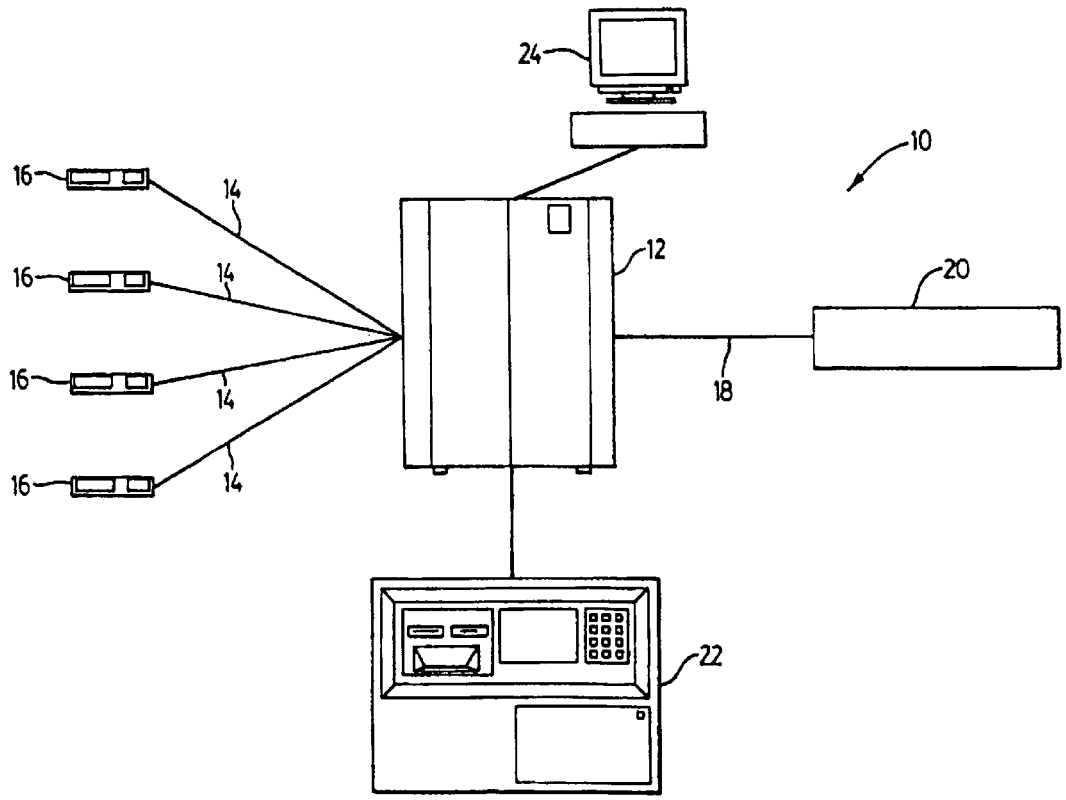

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

* * * * *